United States Patent [19]
Gautier et al.

[11] Patent Number: 5,090,298
[45] Date of Patent: Feb. 25, 1992

[54] BRAKE BOOSTER WITH SEALED PASSAGE FOR MOUNTING

[75] Inventors: Jean-Pierre Gautier, Aulnay Sons Bois; Miguel Perez, Argenteuil, both of France

[73] Assignee: Bendix France, Drancy, France

[21] Appl. No.: 315,365

[22] Filed: Feb. 24, 1989

[30] Foreign Application Priority Data

Feb. 29, 1988 [FR] France .................... 88 02488
Aug. 29, 1988 [FR] France .................... 88 11322

[51] Int. Cl.$^5$ .................... F01B 19/04; F16J 15/18
[52] U.S. Cl. .................... 92/98 D; 92/96; 92/165 PA
[58] Field of Search ............ 91/369.1, 369.2, 369.3, 91/369.4, 376 R; 180/90, 90.6; 92/96, 98 R, 98 D, 165 PR, 166, 169.1

[56] References Cited

U.S. PATENT DOCUMENTS

| | | | |
|---|---|---|---|
| 4,270,353 | 6/1981 | Thomas et al. | 91/369.2 X |
| 4,270,438 | 6/1981 | Thomas et al. | 91/49 |
| 4,271,750 | 6/1981 | Thomas et al. | 92/98 D |
| 4,398,449 | 8/1983 | Takayama et al. | 91/369.3 |
| 4,418,611 | 12/1983 | Tateoka et al. | 91/369.2 |
| 4,428,274 | 1/1984 | Takeuchi et al. | 91/369.2 |
| 4,614,149 | 9/1986 | Omi | 92/169.1 X |
| 4,621,564 | 11/1986 | Nishii | 92/169.1 X |
| 4,783,964 | 11/1988 | Fanelli et al. | 92/169.1 X |

FOREIGN PATENT DOCUMENTS

| | | | |
|---|---|---|---|
| 546873 | 9/1985 | Australia . | |
| 119880 | 9/1984 | European Pat. Off. . | |
| 0164198 | 12/1985 | European Pat. Off. | 91/369.2 |
| 3245638 | 9/1983 | Fed. Rep. of Germany . | |
| 2406551 | 5/1979 | France . | |
| 0096048 | 6/1984 | Japan | 91/369.2 |
| 2044376 | 10/1980 | United Kingdom | 91/369.2 |
| 2086504 | 5/1982 | United Kingdom | 91/369.2 |
| 2087498 | 5/1982 | United Kingdom | 92/169.1 |
| 2092251 | 8/1982 | United Kingdom | 91/369.2 |
| 2111152 | 6/1983 | United Kingdom | 92/169.1 |
| 2117466 | 10/1983 | United Kingdom | 92/169.1 |

Primary Examiner—Edward K. Look
Assistant Examiner—John E. Ryznic
Attorney, Agent, or Firm—Larry J. Palguta; Ken C. Decker

[57] ABSTRACT

The invention relates to a brake booster comprising a casing (10) and a flexible diaphragm (12) which sealingly divides the interior of the casing into a front chamber (16) and a rear chamber (18). According to the invention, it possesses at least one passage which extends sealingly through it from one face of the casing to the opposite face. The invention is utilized for the braking of motor vehicles.

9 Claims, 3 Drawing Sheets

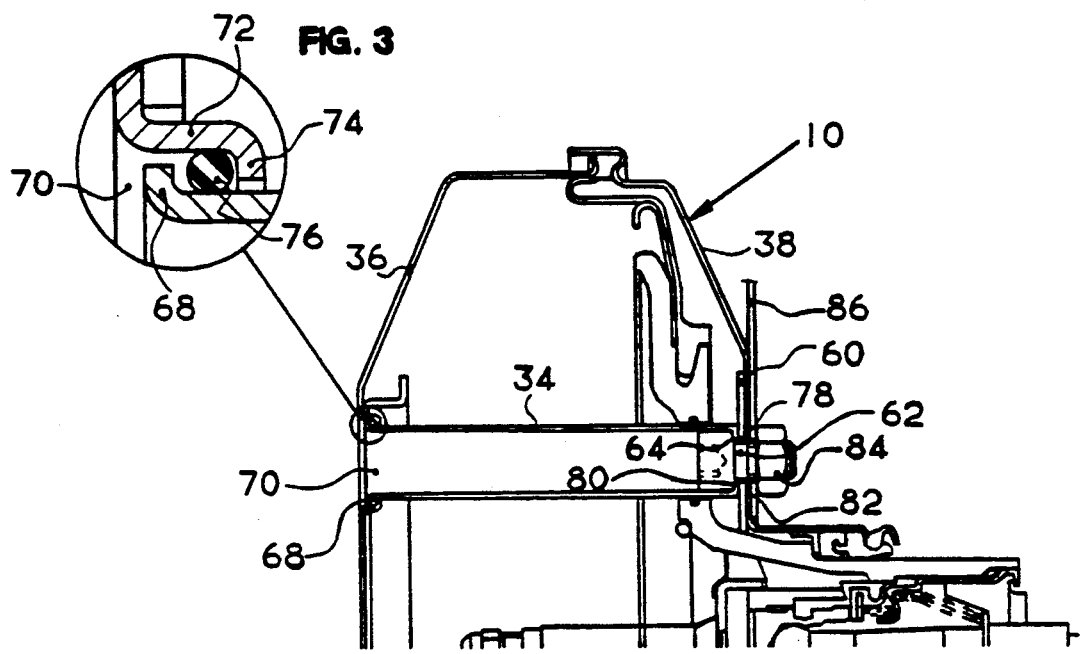
FIG. 3
FIG. 2
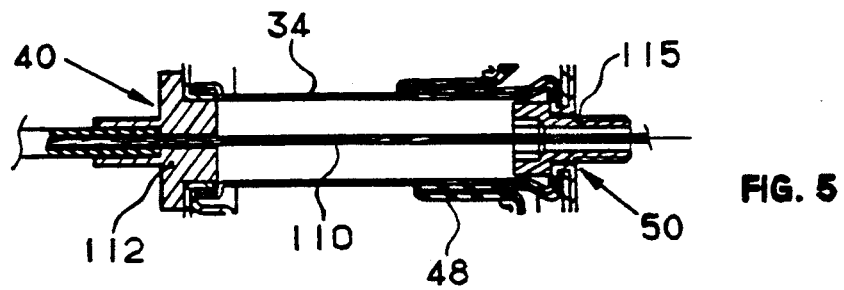
FIG. 5
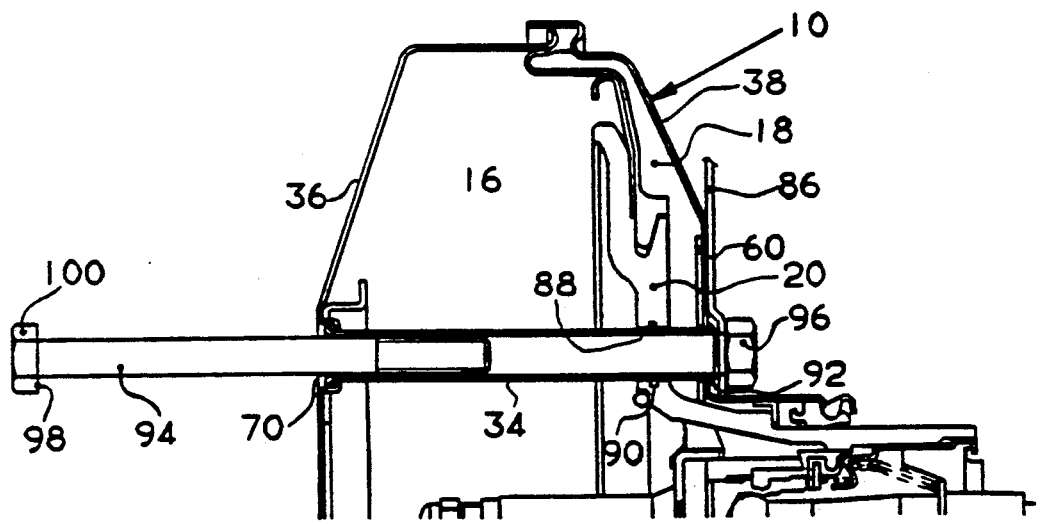
FIG 4

BRAKE BOOSTER WITH SEALED PASSAGE FOR MOUNTING

The invention relates to a brake booster and advantageously applies to all motor vehicles in which the brake circuit is equipped with such a booster.

A brake booster of conventional design, for example that described in the document U.S. Pat. No.4,445,335, comprises particularly an outer casing, in which a front chamber and a rear chamber are formed on either side of a flexible diaphragm fastened sealingly to a hollow piston movable in the direction of the axis of the booster. As a general rule, the booster is mounted on the apron of the engine compartment of the vehicle by means of mounting screws which are fastened to the rear part of the casing on the same side as the engine compartment. Bolts therefore have to be clamped on the mounting screws on the same side as the passenger compartment of the vehicle. This operation has disadvantages for the manufacturers during the production of the vehicle, because it makes it necessary to carry out jobs both from the engine compartment side and from the passenger compartment side.

A first object of the present invention is, therefore, to provide a brake booster which it is possible to mount in a vehicle by working only on the same side of the wall on which the booster is mounted.

It is known, on the other hand, that such a booster is a relatively bulky article and that it impedes the passage of linkages, cables or rods connected to the other control devices of the vehicle, particularly to the accelerator or clutch pedals.

Another object of the present invention is, therefore, to provide a brake booster which, despite its size, does not impede the passage of the other control elements.

The invention therefore relates to a brake booster comprising a casing and a flexible diaphragm, which sealingly divides the interior of the casing into a front chamber and a rear chamber, and a hollow piston which is movable in the casing and to which the flexible diaphragm is fastened. According to the invention, it possesses at least one passage which extends sealingly through the booster from one face of the casing to the opposite face, this passage consisting of a tube, the first end of which is fastened inside the casing on one of the faces of the latter and the second end of which is mounted sealingly slidably on a radial shoulder provided for this purpose inside the casing on the other face of the latter.

Other characteristics of the invention form the subject of the subclaims.

From U.S. Pat. No. 4 270 353, U.S. Pat. No. 4 270 438, U.S. Pat. No. 4 271 750, and EP-A-0 119 880, is known a brake booster comprising a rod which extends sealingly through the booster from one face of the casing to the opposite face, but this rod is a member transmitting the forces to which the casing is submitted, and is fastened at its both ends to the opposite faces of the casing.

The invention will now be described by way of example with reference to the accompanying drawings in which:

FIG. 2 is a partial view in longitudinal section of a booster according to a second embodiment of the invention;

FIG. 3 is a cross-section on a larger scale of part of FIG. 2;

FIG. 4 is a view, similar to that of FIG. 2, of a booster according to a third embodiment of the invention;

FIG. 5 is a partial sectional view of a booster according to FIG. 1, through which a control means passes.

FIG. 1 illustrates a brake booster intended to be arranged in the conventional way between the brake pedal of a vehicle and the master cylinder controlling the hydraulic brake circuit.

Figures 1, 1A, 1B:
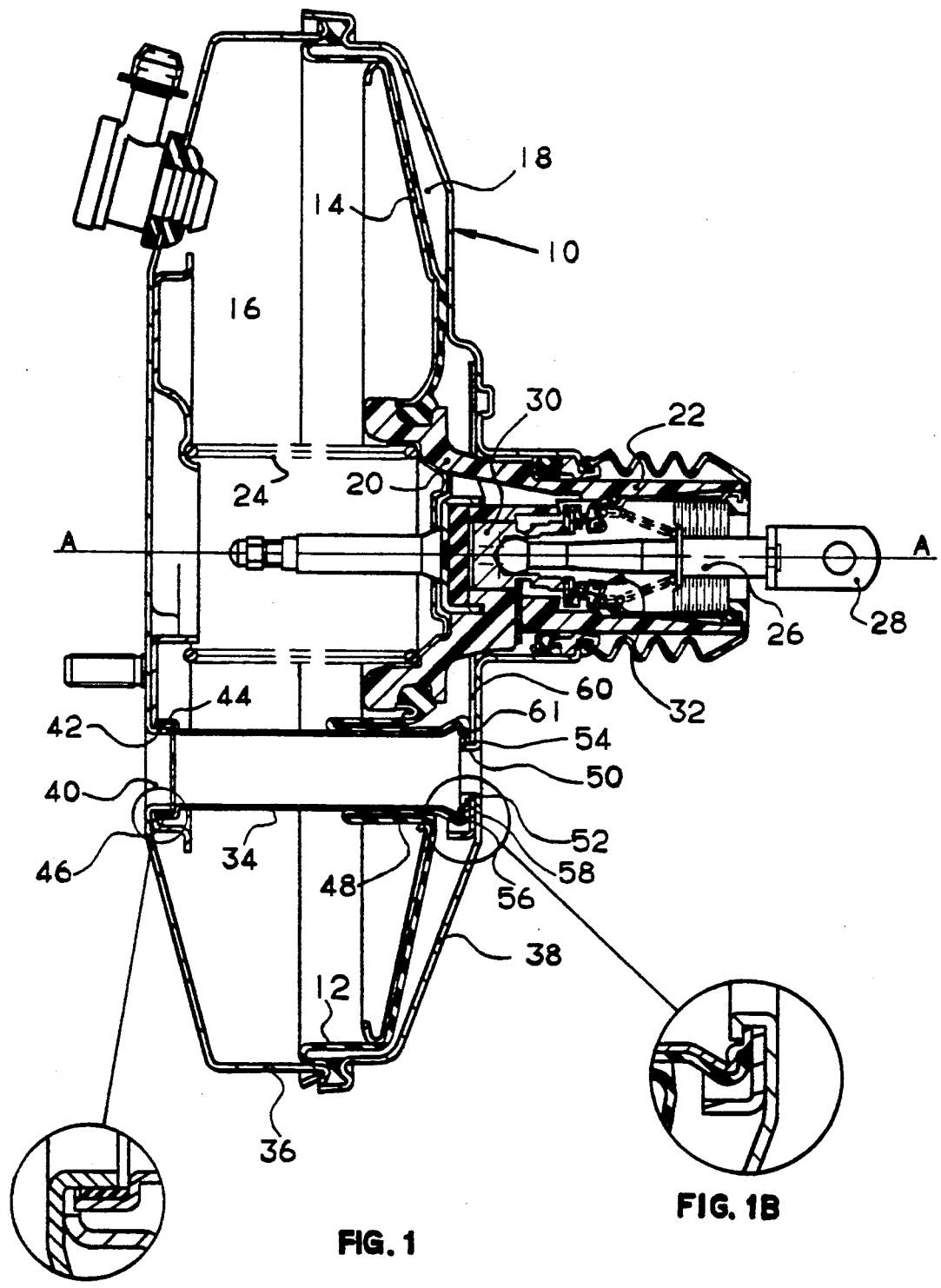
FIG. 1 is a view in broken longitudinal section of a brake booster produced according to a first embodiment of the invention.
FIG. 1A is an enlarged view of the encircled portion of the booster of FIG. 1.
FIG. 1B is an enlarged view of the encircled portion of the booster of FIG. 1.

The booster comprises a shell-shaped outer casing 10 which, in the example shown, has substantially a symmetry of revolution about an axis A—A. A flexible elastomeric diaphragm 12 reinforced in its central part by a metal supporting disc 14 defines, within the casing 10, a front chamber 16 and a rear chamber 18. A hollow piston receives an inner circular edge of the diaphragm 12 and is extended rearwards in the form of a tubular part 22 which passes sealingly through the rear wall of the casing 10. A restoring spring 24 ensures that the assembly consisting of the piston 20 and of the diaphragm 12 assumes the resting position shown.

In a known way, the tubular part 22 of the hollow piston 20 receives a tappet 26 which has a free end 28 intended to be connected to the brake pedal (not shown). The other end of the tappet 26 has a plunger 30 which, when the booster is activated, is intended for actuating a conventional valve means 32 which controls the passage of air towards the rear chamber 18 in a known way.

According to the invention, the booster also possesses sealed passages extending through the casing 10, but isolated from this, as described in detail below.

By definition, the elements located on the left in the FIG. will hereafter be called "front" and those located on the right "rear".

The booster comprises at least one metal tube 34 which passes completely through the casing 10. The casing 10 is formed in two parts 36 and 38, of which the front part or front face 36 has an orifice 40 bordered by an annular shoulder 42. One end of the tube 34 is formed with an annular collar 44 of widened diameter which is mounted round the annular shoulder 42. A gasket 46 is mounted between the shoulder 42 and the collar 44.

The tube 34 extends through the inner volume of the casing 10 and passes through the diaphragm 12. The diaphragm 12, in the region where it is pierced by the tube 34, has a sleeve 48 which sealingly mates with the outer surface of the tube 34. The rear part or rear face 38 of the casing 10 is equipped with an orifice 50 defined by an annular flange 52 which has a radial border 54 turned down inwards. At the rear, the tube 34 has an annular part 56 of widened diameter which is formed with a radial rim 58. During the production of the booster, the radial rim 58 is crimped between the radial border 54 of the rear face 38 of the casing 10 and a reinforcing plate 60 mounted in a stationary manner on the rear face 38. Thus, the rear end of the tube 34 is mounted fixed to the rear face 38. The sleeve 48, at its open end, has a bead 61 which is retained between the radial rim 58 and the reinforcing plate 60.

In its use for fastening the booster to a supporting surface adjacent to the rear face, a fastening member is arranged in the orifice 50 in the rear face 38 of the casing 10; this screw has a radial surface which bears against the radial border 54. When the booster is mounted on a vehicle, the operator inserts a tool, for example a hexagonal spanner, into the tube 34 from the engine compartment and rotates the screw by engaging the spanner into a corresponding hollow head of the screw, this interacting with a nut mounted in a stationary manner on the apron of the vehicle on the passenger compartment side.

Thus, the present invention makes it possible to mount the booster on the vehicle easily, the operator working in the engine compartment and having no need to gain access to the interior of the vehicle.

FIG. 2 illustrates a second embodiment for the fastening of the booster, but the characteristics mentioned can be put into practice for other uses. According to a first characteristic, the tube 34 is retained in place by the screw 62 which can have an axial bore, thus avoiding the need for crimping on the end of the tube. According to a second characteristic, the tube 34 has an annular lip 68 at its front end (see FIG. 3). The front face 36 of the casing 10 possesses an orifice 70 formed by an annular axial shoulder 72 which has a rim 74 turned down inwards. An annular gasket 76 is enclosed between the tube 34, the axial shoulder 72, the radial shoulder 68 and the rim 74 of the orifice 70. The rear end of the tube 34 has an inner radial rim 78 which forms an inner annular bearing surface 80. The rear face 38 possesses an orifice 82 receiving a screw 62 which, as in the preceding example, has a radial surface 64 which bears against the radial rim 78 of the tube 34. The screw 62 is clamped in a nut 84 fixed to the apron 86 of the vehicle, by means of a tool inserted into the tube 34.

In this example, the screw 62 has several possible functions: it can serve for mounting the booster on the apron 86; it retains the tube 34 in position; and when it is equipped with a bore it serves as a guide for a control element passing through the booster.

To ensure the sealing of the casing 10, the screw 62 can have a gasket.

The embodiment illustrated in FIG. 4 differs from that of FIGS. 2 and 3 in the way in which the rear end of the tube 34 is retained on the rear face 38 of the casing 10.

In this embodiment, the tube 34 is longer than that of FIG. 2 and, as described below, projects slightly on the outside of the casing 10. The tube 34, at its front end, has an annular lip 68 substantially similar to that of FIG. 2. As in the preceding embodiment, the front part 36 possesses an orifice 70 formed by an annular axial shoulder 72 which has a rim 74 turned down inwards. An annular gasket 76 is arranged round the tube 34 and is retained between the shoulder 68 and the rim 74. During the production of the booster, the tube 34 is inserted into the orifice 70 and passes through an orifice 88 in the piston 20 and through the reinforcing plate 60 and the rear face 38 of the casing 10. An annular gasket 90 is mounted in the orifice 88 in order to ensure sealing between the chambers 16 and 18 of the booster. After the tube 34 has been installed, a radial rim 92 is turned down against the outer surface of the rear part 38, thus retaining the tube 34, the reinforcing plate 60 coming to bear against an annular shoulder on the tube 34. The booster is mounted above the apron 86 by means of an assembly screw 94 which interacts with a nut 96 mounted in a stationary manner on the apron 86. A radial surface 98 of the head 100 of the screw 94 bears against the radial shoulder 68, thus retaining the booster on the apron 86. The length of the tube 34 is such that, during the tightening of the screw 94, the front face 36 of the casing 10 remains without any mechanical stress. The mounting of this embodiment of the booster differs from the two preceding ones in that the head 100 of the screw 94 remains outside the tube 34. There is therefore no need to insert a tool into the tube. Of course, this embodiment makes it possible to mount the booster by working only on the engine compartment side, as was true of the other embodiments.

FIG. 5 shows, in partial cross-section, a passage provided to allow a cable 110 to pass through the booster. Plugs 112 and 115 penetrate forcibly into the orifices 40 and 50. These plugs are pierced axially so as to function as cable guides within the passage. Of course, these plugs could be shaped so as to serve as guides for a rod or the like.

Figures 6, 6A:
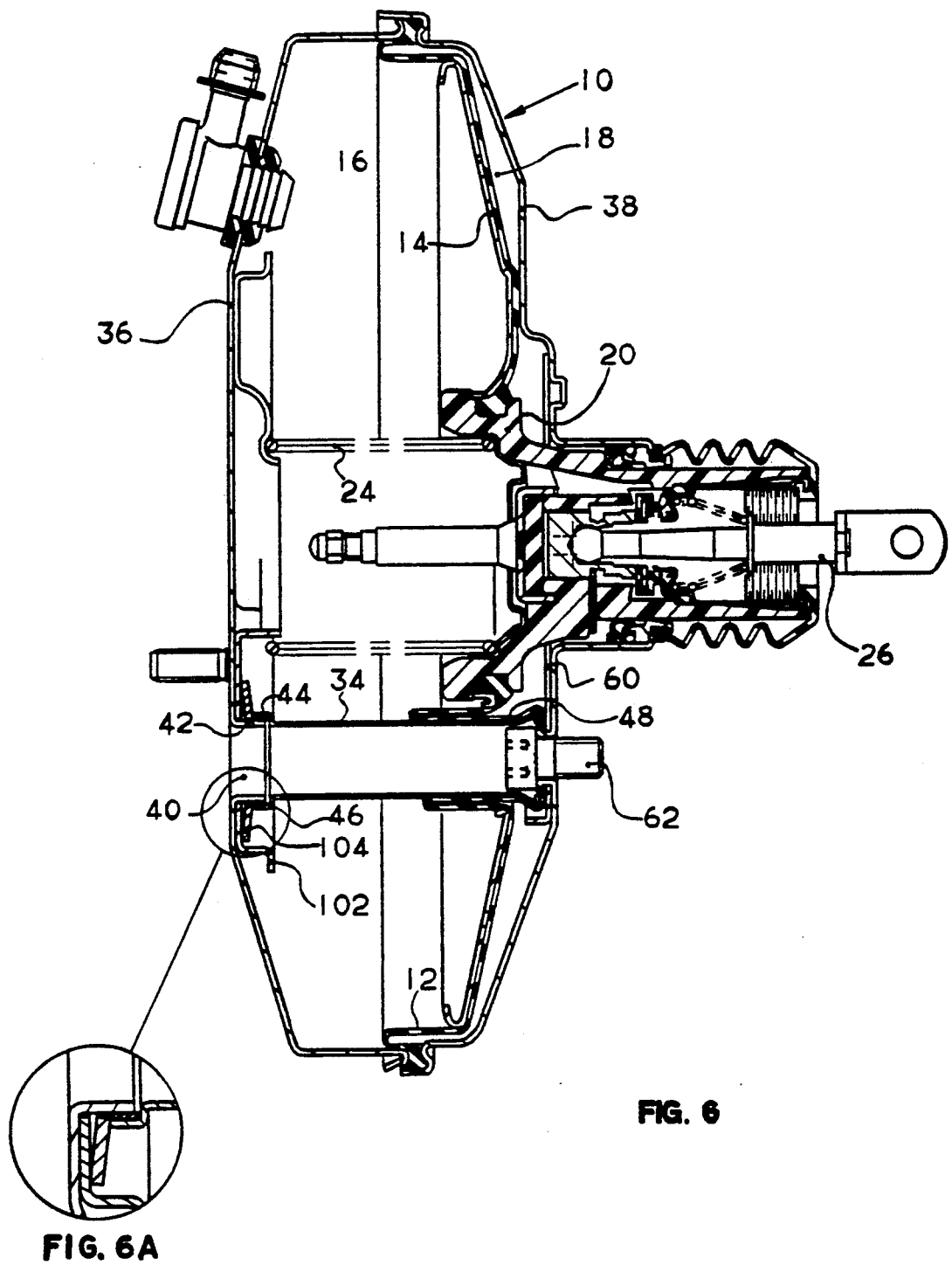
FIG. 6 is a view in broken longitudinal section of a booster according to a fourth embodiment of the invention.
FIG. 6A is an enlarged view of the encircled portion of the booster of FIG. 6.

The embodiment illustrated in FIG. 6 resembles that of FIG. 1, but differs from this in that the tubes 34 also make it possible to transmit mechanical stresses via the casing 10 of the booster. The structure of the booster is substantially identical to that of the embodiment of FIG. 1 and will not be described again.

The booster of FIG. 6 possesses a Belleville washer 104 between the annular collar 44 of the tube 34 and a front reinforcing plate 102. During the production of the booster, the washer 104 is mounted with some prestress. The result of this prestress is that the tube 34 serves for reinforcing the casing 10, transmitting mechanical forces directly from the master cylinder to the apron of the engine compartment. The booster also possesses assembly screws, of which one 106 is shown in FIG. 6 and which are intended for receiving the master cylinder (not shown). When the device is activated, the forces generated between the tappet 26 and the master cylinder can partially pass via the tubes 34, thus relieving the casing 10 of some of the stresses.

The washer 104 could be replaced by another type of spring, for example a helical spring, and the collar 44 could be crimped with some prestress onto the annual shoulder 42, thus avoiding the need to use the washer 104.

We claim:

1. A brake booster comprising a casing and a flexible diaphragm which sealingly divides the interior of the casing into a front chamber and a rear chamber, a hollow piston which is movable in the casing and to which said flexible diaphragm is fastened, and at lease one passage which extends sealingly through said booster from a face of the casing to an opposite face of the casing, said passage comprising a tube a first end of which is fastened inside the casing to one of the faces of said casing and a second end of which is mounted sealingly and slidably on an annular shoulder inside the casing and at the other face of said casing, the second end sealingly and slidably engaging the annular shoulder.

2. The booster according to claim 1, wherein said second end has an annular lip directed towards said annular shoulder which possesses a rim turned down towards said tube, a space contained between said annular lip, said annular shoulder, said tube and said rim enclosing a gasket.

3. The booster according to claim 1, wherein spring means is arranged between said second end of said tube and the other face of said casing, in order to exert a prestress between said faces of said casing.

4. The booster according to claim 1, wherein said first end has a radial rim crimped to one face of the casing by means of an edge of an orifice provided for said passage.

5. The booster according to claim 1, wherein said tube passes through said flexible diaphragm.

6. The booster according to claim 5, wherein said flexible diaphragm possesses an open sleeve through which said tube passes and an open end of which has a bead compresses between a radial rim of said first end and the one face of said casing.

7. The booster according to claim 1, wherein said tube passes through said hollow piston, an annular gasket ensuring sealing between said chambers.

8. The booster according to claim 1, wherein at least two passages are provided, each receiving a fastening member such as a screw.

9. The booster according to claim 1, wherein at least one of the ends of said tube is closed by means of a pierced plug functioning as a guide for an element passing through said tube.

* * * * *